May 5, 1959 C. F. BROWN 2,885,635
APPARATUS FOR TESTING MERCURY SWITCHES
Filed May 11, 1949 3 Sheets-Sheet 1
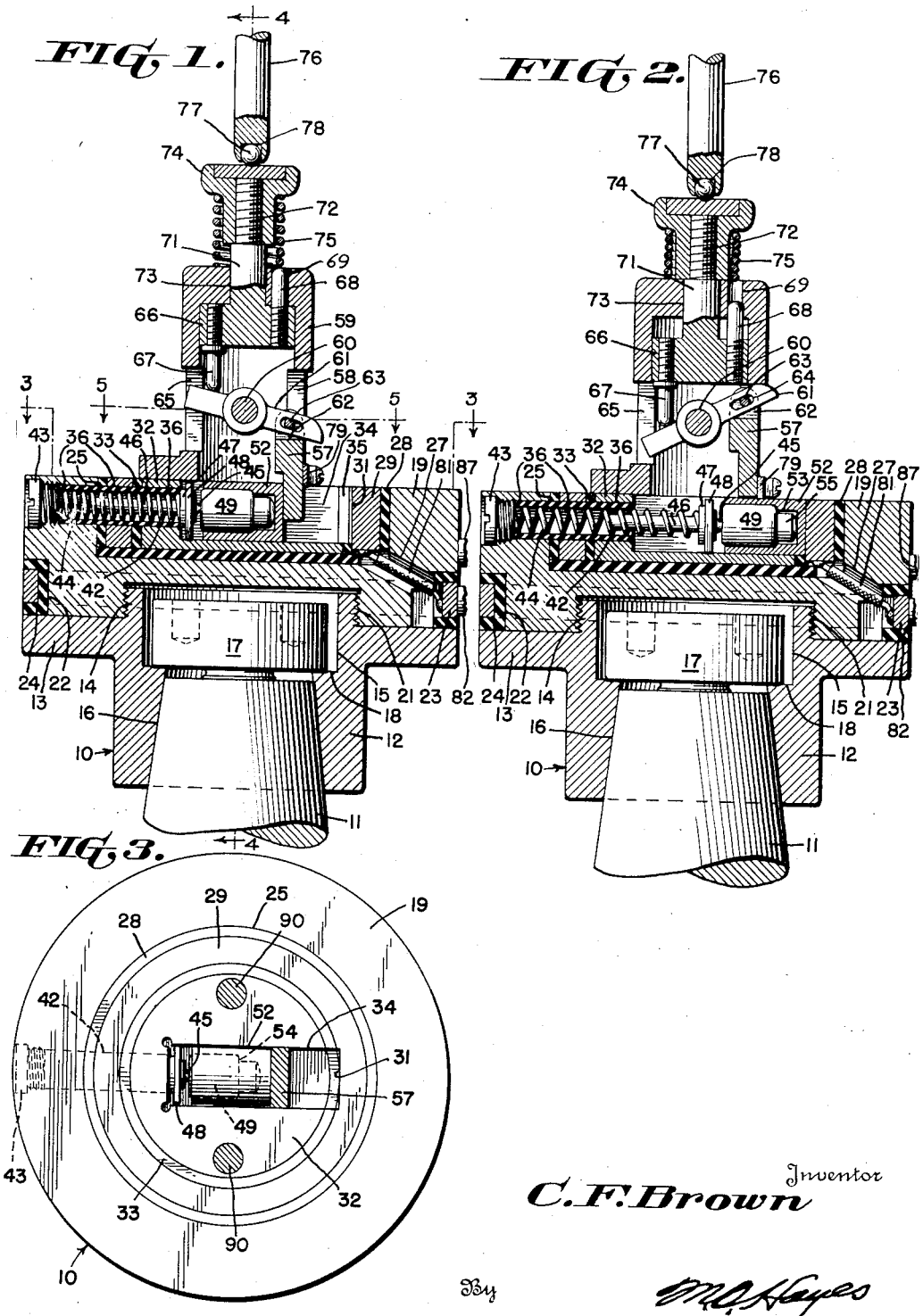
C. F. Brown, Inventor
By M. O. Hayes, Attorney May 5, 1959 C. F. BROWN 2,885,635
APPARATUS FOR TESTING MERCURY SWITCHES
Filed May 11, 1949 3 Sheets-Sheet 2

Inventor
C. F. Brown
By M. C. Hayes
Attorney

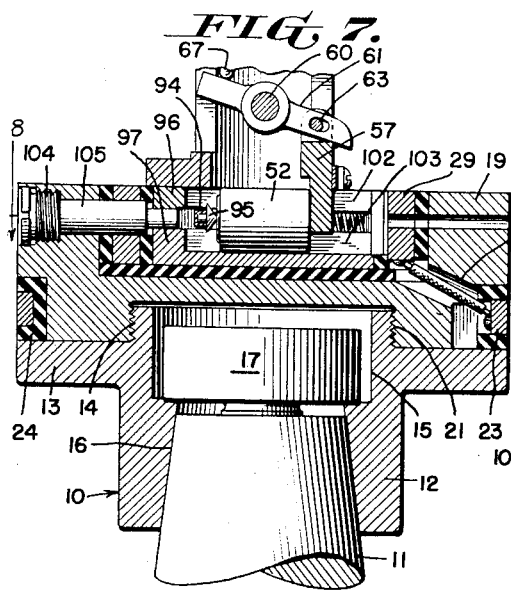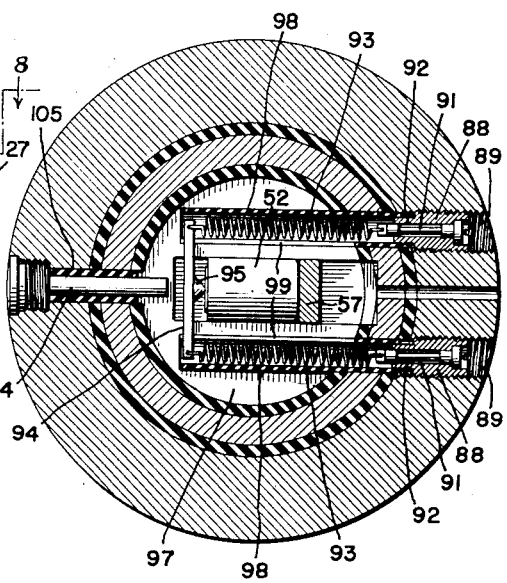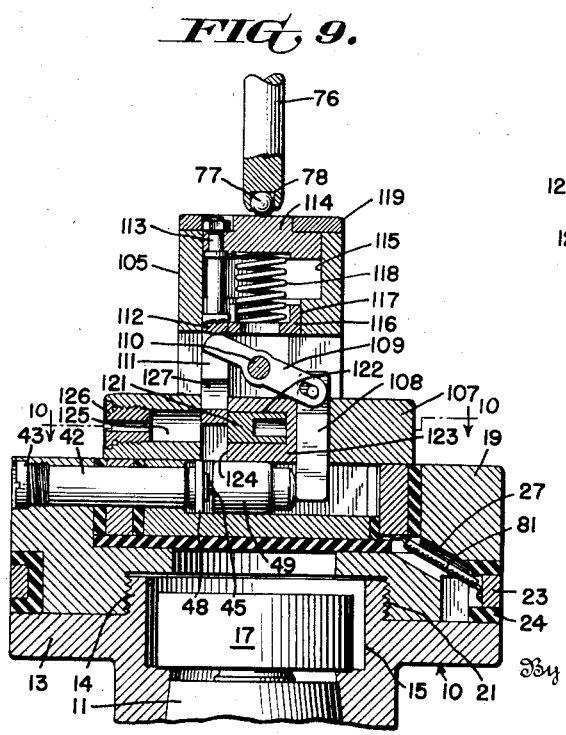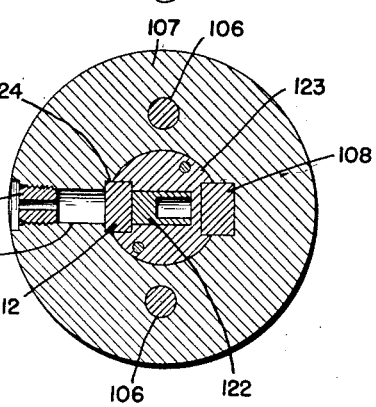

United States Patent Office 2,885,635
Patented May 5, 1959

2,885,635

APPARATUS FOR TESTING MERCURY SWITCHES

Calvin F. Brown, Silver Spring, Md.

Application May 11, 1949, Serial No. 92,711

7 Claims. (Cl. 324—28)

(Granted under Title 35, U.S. Code (1952), sec. 266)

The present invention relates to improvements in apparatus for testing certain operating characteristics of mercury switches for use in the arming circuits of spinning projectiles. More particularly the invention relates to improvements in my U.S. Patent No. 2,498,026 for Mercury Switch Tester issued February 21, 1950 which discloses testing apparatus for determining the period of time necessary to operate such mercury switches under conditions which closely approximate those encountered in the field.

Related prior art devices fail to duplicate field conditions with respect to spin acceleration time and set-back forces. Such devices require a long period of acceleration after the start of a test to bring the switch to the normal speed of rotation, whereas under field conditions a projectile containing the switch, upon being fired from a gun, reaches the normal speed of rotation substantially instantaneously.

The testing apparatus of the aforesaid copending application avoids these disadvantages of prior art devices by the provision of means for attaining the normal speed of rotation prior to the initiation of a test and by providing a shock force to the switch at the initiation of a test. Before the initiation of the test, the switch is held in an axial position by a latch mechanism which, in turn, is held in operative position against the opposing force of a spring, and release of the latch depends entirely on the action of the aforementioned spring as the energy stored therein is released. Prior to release of the switch by the release mechanism the switch is held at an axial point in an accelerated chuck until the speed of the chuck has reached a desired value. Upon release thereof by the latch mechanism, the switch is moved by spring force out of its axial position and is driven by a combination of centrifugal and spring force against a wall of the chuck thereby producing a shock to the switch to initiate movement of the mercury contained in the switch through a porous diaphragm located intermediate the ends thereof. When the switch has moved to the off-center position, centrifugal force completes the movement of the mercury through the diaphragm thereby energizing or deenergizing the switch depending on the relative end-to-end position of the switch with respect to the axis of rotation.

An object of the present invention is to provide a new and improved arrangement of apparatus for testing mercury arming switches in which field conditions are more closely approximated than heretofore.

According to the specific arrangement of the present invention and as another one of the objects and features thereof, improvements in my prior art release mechanism are contemplated wherein the force for releasing the latch mechanism is applied directly thereto by the operator whereby positive operation of the release mechanism is provided.

The present invention, as another object and feature thereof, also makes provision for improvements in the means for forcibly moving the mercury switch, upon release thereof, wherein the switch driving spring is constructed and arranged to increase the switch driving force thereby more effectively to accomplish the function of the spring for the purpose intended.

In accordance with an alternative embodiment of the spring driving arrangement wherein a pair of springs are employed and as an additional feature of the invention, the adverse effects of centrifugal forces acting upon the switch driving springs are obviated and, to some extent, utilized to effect a more positive external contacting of the switch.

According to a further feature and object of the invention, provision is made for counterbalancing the rotating chuck to compensate for the movement of the switch and associated parts to the eccentric position thereof.

Other objects and many of the attendant advantages of this invention will be readily appreciated as the same becomes better understood by reference to the following detailed description when considered in connection with the accompanying drawings wherein:

Fig. 1 is a vertical sectional view illustrating a preferred form of the present invention and showing the switch in the axial position;

Fig. 2 is a view similar to that of Fig. 1 and showing the switch in the off-center or eccentric position;

Fig. 3 is a sectional view taken along line 3—3 of Fig. 1;

Fig. 7 is a vertical sectional view of a modification of the present invention;

Fig. 8 is a sectional view taken along line 8—8 of Fig. 7;

Fig. 9 is a vertical sectional view of a further modification of the present invention; and Fig. 10 is a sectional view taken along line 10—10 of Fig. 9.

Figure 4:
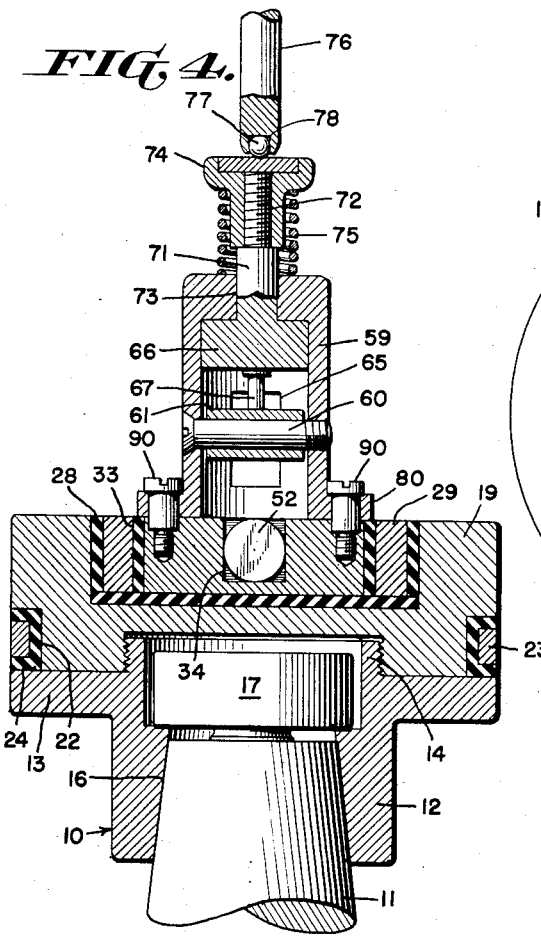
Fig. 4 is a sectional view taken along line 4—4 of Fig. 1.
Figure 5:
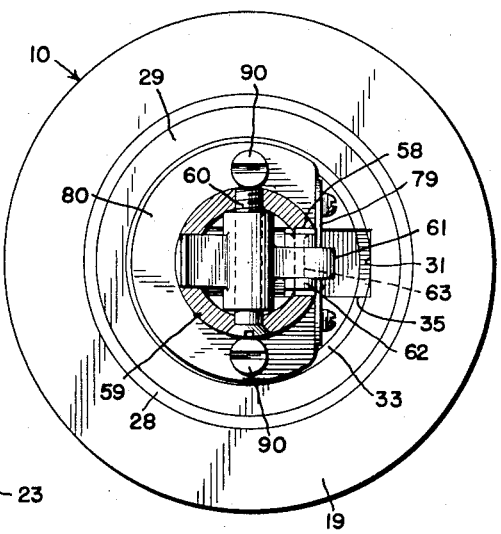
Fig. 5 is a sectional view taken along line 5—5 of Fig. 1.
Figure 6:
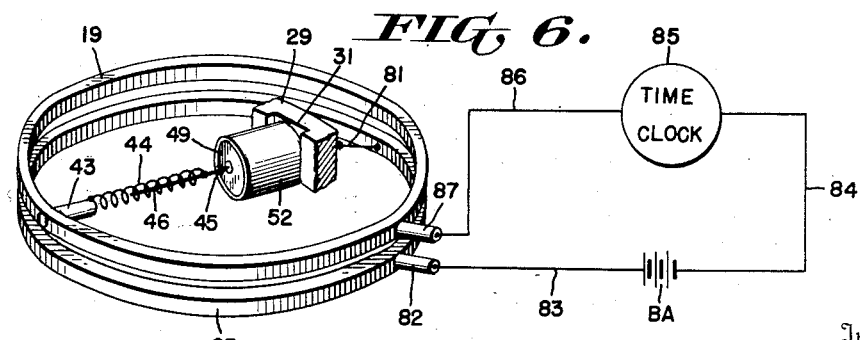
Fig. 6 is a diagrammatic view of an electrical circuit for use with the device of the present invention.

Referring more particularly to the drawings, in which like numerals of reference indicate like parts throughout the several views, the numeral 10 indicates generally a chuck constructed in accordance with the present invention and mounted on a driven shaft 11, the driving means therefor not being shown. The chuck 10 comprises a hub portion 12 having a flange 13 and an externally threaded lip 14. The hub portion 12 also is provided with a central bore 15 and a tapered bore 16 to receive respectively a headed retaining screw 17 and the tapered end of shaft 11. The head of screw 17 bears against a shoulder 18 defined by the juncture of the bores 15 and 16.

A circular head portion 19 is provided with an internally threaded bore 21 for engagement with the threaded lip 14 of hub portion 12 thereby to secure the head portion to the hub portion. Head 19 is provided with a peripheral reduced step 22 which cooperates with flange 13 to form a groove to receive a contact ring 23. Contact ring 23 is electrically insulated from the head 19 and flange 13 by insulation 24.

Head 19 is also provided with circular recess 25 which communicates with a radial bore 36 and an angular bore 27. Bore 27 communicates with step 22.

Mounted in recess 25 and electrically insulated therefrom by insulation 28 is a metal ring 29 having a flat portion 31 formed on the inner periphery thereof. A metallic disc 32 is arranged within the ring 29 and insulated therefrom as at 33. Disc 32 is formed with a guide slot 34 the open end of which is aligned with a cut out portion 35 of insulation 33 and the flat portion 31 of ring 29. Bores 36 are also provided in disc 32, insulation 33, ring 29, insulation 28, and head 19 in mutual axial alignment to receive a tubular insulator 42. The outer end of bore 41 is enlarged and threaded to receive cap screw 43. A spring 44 is mounted within the insulator 42 and has one end thereof bearing against the screw 43. Contact member 45 is provided with a stem 46 extending within spring 44. Head 47 of contact member 45 which bears against the outer end of the spring 44 has arranged thereon a block of insulating material 48. Block 48 acts to insulate the contact member 45 from the guide slot 34.

Mercury switch 49 is placed within bore 51 of a protective cup 52. The bore 51 is provided with a reduced end 53 forming a shoulder 54. Mercury switch 49 has a reduced end 55 and a shoulder which engages shoulder 54 of cup 52. As indicated in Fig. 1 of the drawings, contact member 45 has a conical shaped end which engages a contact at one end of the mercury switch through the action of spring 44.

In order to retain the mercury switch in an axial position during the period of acceleration of the chuck 10 and to provide for a positive release of the switch after a desired speed has been attained the hereinafter described improved latch mechanism has been provided. A sliding latch 57 is mounted in slot 58 of a tubular housing 59. A lateral shaft 60 is positioned within the housing to pivotally support a lever 61. Latch 57 has a bifurcated end 62 having a pin 63. Lever 61 is provided at one end with an elongated slot 64 through which pin 63 extends. The other end of lever 61 extends into a slot 65 in housing 59, slot 65 being diametrically opposite to slot 58. A plunger 66 is slidably arranged within the housing 59. A threaded pin 67 is secured to the plunger 66 and extends beyond the end thereof to contact the arm of lever 61 which extends into slot 65.

Another pin 68 is mounted on plunger 66 and is slidably arranged in bore 69 of housing 59 for the purpose of maintaining pin 67 in operative alignment with lever 61. Plunger 66 has extending therefrom a shaft 71 having a threaded extension 72. Shaft 71 is slideably arranged in bore 73 of housing 59, while extension 72 is threaded into cap 74. Cap 74 retains a spring 75 which yieldably holds plunger 66 in the retracted position. An operating rod 76 having an anti-friction ball 77 mounted at one end thereof in a socket 78 bears against cap 74.

In order to yieldably retain latch 57 in the extended position as in Fig. 1 a tensioned clamp 79 is provided. It also is pointed out that ring 29 is electrically connected with ring 23 by conductor 81 which passes through bore 27.

It further is to be noted that tubular member 59 is provided with a flange 80 and is secured to disc 32 by means of bolts 90.

It is, of course, understood that during the manufacture of the device, flat portion 31 may be spaced at a variety of distances from the axis of rotation of hub 10 to provide for a greater or lesser distance of travel of the mercury switch 49 in guide groove 34, thus a shock force is provided for a given speed of rotation which is small when the distance of travel is less and large when the distance is great.

It is also to be understood that the shock applied to the switch 49 as it contacts flat portion 31 may be varied by employing materials having different degrees of hardness in ring 29 in which flat portion 31 is formed. Thus the force of impact of switch 49 with portion 31 is largely absorbed when a soft material is employed in ring 29, while switch 49 receives a substantially larger impact force when a hard material is employed in ring 29.

In operation the mercury switch 49 is inserted into cup 52 which, in turn, is placed in guide slot 34, with contact member 45 bearing against a center contact at one end of the switch. Switch 49 is of a well-known variety for use in the arming of spinning projectiles wherein mercury is forced from one chamber to another through a porous diaphragm by centrifugal force, such force being generated by the spinning action imparted to a projectile containing the switch as it is propelled along the rifling of a gun barrel by an explosive charge. In the device of the present invention shaft 11 is brought to a predetermined speed of rotation by any well-known driving means (not shown). When such speed is attained latch 57 is withdrawn from guide slot 34 by means of an axial movement imparted to plunger 73 by rod 76 under control of an operator. As plunger 73 is moved from the position indicated in Fig. 1 to the position indicated in Fig. 2 pin 67 urges lever 61 to retract latch 57, thereby freeing cup 52 and switch 49. Spring 44 through contact member 45 moves the cup and switch out of the axial position and combined with centrifugal force continues the movement thereof to the end of guide slot 34 where the cup is brought forcibly into contact with metal ring 29. As will be apparent, switch 49 receives a shock as cup 52 contacts ring 29 during the aforementioned operation. This shock is of particular importance, in that, the initial penetration of the mercury, contained in the switch, through the porous diaphragm is facilitated thereby.

As cup 52 contacts ring 29 a circuit is closed through the switch 49, cup 52, ring 29, conductor 81, ring 23, a brush contact 82, conductor 83, a source of power such, for example, as battery BA, conductor 84, time clock 85, conductor 86, brush contact 87, head portion 19, cap screw 43, spring 44, stem 46, contact member 45 to ground contact of switch 49 thereby to set into operation the clock 85. Clock 85 continues to operate until the mercury contained in switch 49 has moved from the energized position on one side of the porous diaphragm to the deenergized position on the opposite side of the diaphragm. When this operation has been completed the aforementioned circuit is deenergized and the clock is stopped, thereby indicating the period of time necessary to complete the movement of the mercury from one side of the diaphragm to the other. In this manner, it is possible, by preventing movement of the switch from an axial position to an eccentric or operative position until a predetermined rotative speed of the chuck has been attained, to closely duplicate field conditions during the testing of such switches without the necessity of mounting the switch in a projectile.

Figs. 7 and 8 of the drawings illustrate a modification of the device of the present invention in which a pair of tension springs are substituted for the compression spring 44 of Figs. 1 and 2. In this form of the invention supports 88 are threadedly mounted in bores 89 in head portion 19. Swivel spring supporting pins 91 are arranged in bores 92 in the supports 88. The springs 93 are secured at one end to pins 91. The other ends of the springs are secured to a yoke bar 94 having a centrally disposed contact 95 which engages a contact positioned on switch 49. Switch 49 is arranged in protective cup 52 as in the device of Fig. 1.

In this form of the invention the disc 32 of Fig. 1 is replaced by a pair of complementary spaced discs 96 and 97. Insulating sleeves 98 are positioned about the springs 93 and in complementary grooves in the discs 96 and 97. Guide slots 99 are formed in the side portions of sleeves 98 to accommodate the yoke bar 94.

The discs 96 and 97 are provided with guide slots 102 and 103 respectively to receive the cup 52. In order to assist in retaining the discs and associated mechanism within the head portion 19 a headed screw pin 104 is threaded in bore 26 of the head portion and extends through similar bores in insulator 28, ring 29, insulator 35, and into a space between discs 96 and 97. An insulator sleeve 105 is arranged about pin 104 whereby the pin is electrically insulated from the ring 29.

The purpose of the aforementioned arrangement of the springs 93 is to provide a more positive tension on the yoke bar 94 during rotation of the chuck, springs 93 and associated mechanism, at this time, being entirely on one side of the axis of rotation and, therefore, are assisted by centrifugal force in assuring a positive engagement of contact 95 with the switch.

A further modification of the present invention is illustrated in Figs. 9 and 10 of the drawings in which the chuck 10 is similar to that of Fig. 1. A housing 105 is secured to the chuck assembly by bolts 106 passing through flange 107 of the housing.

A latch member 108 is slidably mounted in the housing 105 and is operatively connected to one end of a lever 109 pivotally mounted in the housing as at 110. The opposite end of lever 109 is arranged in slot 111 of slide member 112. Member 112 has an extension 113 which is secured to the plunger 114 in bore 115 of housing 105. A spring cup 116 is fixedly mounted in reduced bore 117 communicating with bore 115. Spring 118 is interposed between plunger 114 and cup 116 to yieldably urge the plunger against a retaining plate 119 secured in any well-known manner (not shown) to the housing 105. A counterbalance 121 is mounted in transverse bore 122 of block 123 secured in bore 124 of housing 105. Bore 122 is in axial alignment with bore 125 of flange 107. One end of slide member 112 normally extends between the bores 122 and 125 in such a manner as to prevent movement of the counterbalance 121 out of bore 122. Slide member 112 has a bore 127 adapted to be brought into mutual alignment with bores 122 and 125 to release the counterbalance 121 from bore 122 and permit its movement into bore 125 through bore 127 under action of centrifugal force, such action occurring simultaneously with the release of the switch 49 by latch 108. Thus, it will be seen that counterbalance 121 will offset the unbalance caused as switch 49 moves to an eccentric position relative to the axis of rotation. It will be noted that bore 124 is closed at the outer end thereof by a plug 126.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. In apparatus for testing a mercury switch, the combination of a chuck member constructed and arranged to be mounted on a driven shaft for rotation therewith, said chuck member having a diametral guideway arranged therein perpendicular to the axis of rotation thereof, said guideway being arranged to receive said mercury switch in centric position in said chuck for eccentric sliding movement therein in response to centrifugal force acting thereon as the chuck member rotates, latch and spring means disposed in said guideway at opposite ends of said switch for releasably retaining the switch in said centric position, a housing mounted on said chuck member, a lever pivotally mounted intermediate the ends thereof in said housing having one end thereof connected to said latch member for actuating said latch means to release the switch as the lever is rocked, and manually operable means in positive force transmitting engagement with the other end of said lever for rocking the lever to actuate said latch means when the chuck has reached a desired speed of rotation.

2. Apparatus for testing a mercury switch comprising, a chuck member constructed and arranged to be rotated by a driven shaft, means for supporting said switch on the chuck member at the axis of rotation thereof for movement to an eccentric position in response to the centrifugal force thereon as the chuck rotates, means for releasably retaining the switch at the axis of rotation, a housing mounted on said chuck member, a lever pivotally mounted intermediate the ends thereof in said housing, one end of said lever being pivotally connected to said releasable retaining means for actuating said releasable retaining means as the lever is rocked, and manually operable means in direct force transmitting engagement with the other end of said lever for positively rocking the lever whereby the switch is released from the axis of rotation by the releasable means.

3. Apparatus for testing a mercury switch comprising, a chuck member mounted on a driven shaft for rotation therewith, a pair of spaced discs mounted in said chuck member and forming a guideway perpendicular to the axis of rotation of said chuck member, said guideway being adapted to receive said switch for radial sliding movement therein from an axial position to an eccentric position, latch means for retaining the switch in said axial position until the chuck member has reached a predetermined rotative speed, a lever pivotally mounted adjacent said latch means and having one end thereof attached to said latch means, a manually depressible plunger engaging the other end of said lever for rocking said lever to release said latch thereby to release the switch for movement to said eccentric position when said speed has been attained, a pair of insulating tubular members each of which has an elongated slot arranged along one side thereof, said discs being constructed and arranged to receive said tubular members in spaced relation along the sides of said guideway, a pair of spiral tension springs arranged in the tubular members for moving the switch from the axial position to the eccentric position, a yoke positioned between said discs and having the ends thereof extending into each of the tubular members through the slots thereof, each of the ends of the yoke being attached to one end of each of the springs respectively, the opposite ends of the springs being secured to said chuck member, said yoke having a centrally disposed contact for engagement with said switch whereby electrical contact is continuously maintained between the switch and the chuck, a second contact member for said switch arranged in the chuck member at one end of the guideway and adapted to act as a stop for the switch and to engage the switch when the switch is moved from the axial position to the eccentric position, said contact member being insulated from the chuck member and the discs, a contact ring peripherally mounted in said chuck member and insulated therefrom, said contact ring being electrically connected to said second contact member, a pair of brush contacts for contacting said contact ring and said chuck member respectively, and an electrical circuit including a source of power and a time clock connected by said brushes to said contact ring and said chuck member whereby said time clock is operated when the switch contacts the second contact and is stopped when the switch is opened by centrifugal force thereon during rotation thereof in the eccentric position.

4. Apparatus for testing a mercury switch comprising, a rotatable support having a guideway therein, said guideway being disposed radially with respect to the axis of rotation of said support, said guideway being arranged to receive said switch for sliding movement from a centric position to an eccentric position in response to centrifugal force thereon as the support rotates, a first latch means for releasably retaining the switch in the centric position, a guide bore in said rotatable support, said guide bore being disposed radially with respect to the axis of rotation of said support and extending in a direction diametrically opposed to that of said guideway, a counterbalance weight disposed in said guide bore for movement from a centric position to an eccentric position in response to centrifugal force thereon as the support rotates, a second latch means for releasably retaining said weight in the centric position, and a lever pivotally mounted intermediate the ends thereof and respectively engaging said first and second latch means at opposite ends thereof for moving said first and second latch means to simultaneously release the switch and the weight for movement to the diametrically opposed eccentric positions thereof whereby the dynamic balance of the apparatus is maintained.

5. Apparatus for testing a mercury switch comprising, a chuck member constructed and arranged to be rotated by a driven shaft, means for supporting said switch on the chuck member at the axis of rotation thereof for movement to an eccentric position in response to centrifugal force thereon as the chuck rotates, means for releasably retaining the switch at the axis of rotation, a housing mounted on said chuck member, means mounted in said housing for counterbalancing the unbalance caused by movement of the switch to the eccentric position, a lever pivotally mounted in said housing for actuating said releasable retaining means as the lever is rocked, and manually operable means in direct force transmitting engagement with said lever for positively rocking the lever whereby the switch is released from the axis of rotation by the releasable means.

6. Latch apparatus in a rotary testing device for releasing a mercury switch from an axial position to an eccentric position and comprising, in combination, a housing secured to said testing device and rotatable therewith, a guideway in said housing, a latch member slidably mounted in said guideway and normally in the path of said switch to retain said switch in the axial position thereof, a lever pivotally mounted intermediate the ends thereof in said housing and having one end thereof attached to said latch member, a piston slidably mounted in said housing in spaced adjacency to said lever, a pin mounted on one side of said piston and extending in a direction to engage the other end of said lever, said piston having a shaft extending a distance exteriorly of said housing, yieldable means engaging said shaft for urging said piston in a direction away from said lever, means engaging said piston and said housing for causing said piston to rotate with said housing, and a non-rotating member engaging said shaft for moving said piston in a direction toward said lever thereby to rock said lever and move said latch out of the path of said switch.

7. Latch apparatus in a rotary testing device for releasing a mercury switch from an axial position to an eccentric position and comprising, in combination, a housing secured to said testing device and rotatable therewith, a latch member slidably mounted in said housing and normally in the path of said switch to retain said switch at the axis of rotation of said testing device, a lever pivotally mounted intermediate the ends thereof in said housing and having one end thereof attached to said latch member, a piston slidably mounted in said housing in spaced adjacency to said lever and having a pin mounted thereon extending in a direction toward and engaging the other end of said lever, said piston having a rod extending a distance exteriorly of said housing, yieldable means for urging said piston in a direction away from said lever, and a non-rotating member engaging the extended end of said rod for moving said piston in a direction toward said lever thereby to rock said lever and move said latch to release said switch.

References Cited in the file of this patent

UNITED STATES PATENTS

| | | |
|---|---|---|
| 1,805,192 | Smith | May 12, 1931 |
| 2,498,026 | Brown | Feb. 21, 1950 |